UNITED STATES PATENT OFFICE.

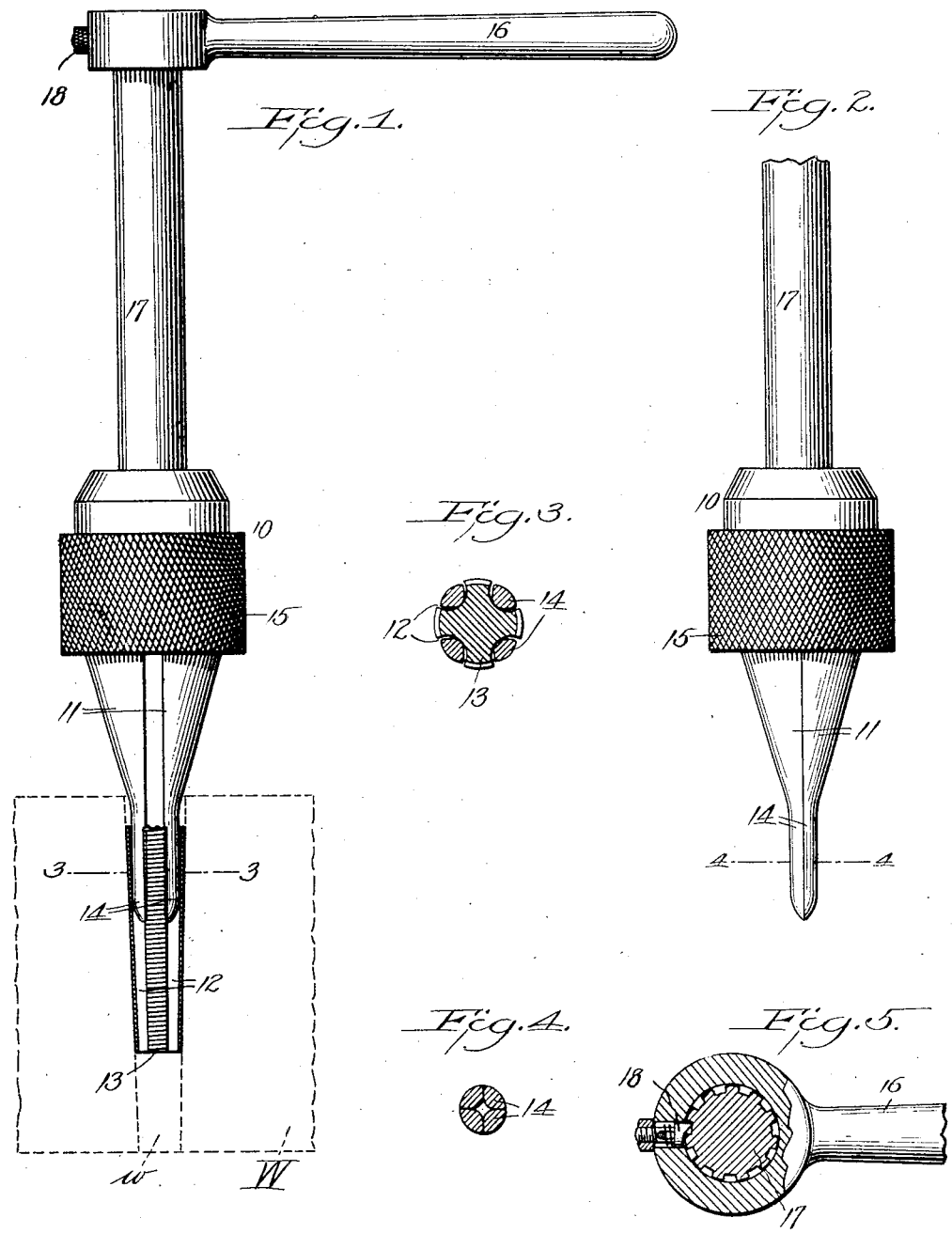

PETER PESA, OF NEWARK, NEW JERSEY.

BROKEN-TAP REMOVER.

1,331,366.  Specification of Letters Patent.  Patented Feb. 17, 1920.

Application filed February 15, 1919. Serial No. 277,160.

*To all whom it may concern:*

Be it known that I, PETER PESA, a subject of the King of Italy, but having declared my intention to become a citizen of the United States, and a resident of Newark, in the county of Essex and State of New Jersey, have invented a new and Improved Broken-Tap Remover, of which the following is a full, clear, and exact description.

This invention relates to metal working devices and has particular reference to means for removing a broken tap from a job in the event of breakage thereof below the surface of the work where it is inaccessible by ordinary means.

In the tapping of a threaded hole in a piece of metal it frequently occurs that the tap breaks at a point within the limits of the hole and for this reason the removal thereof by ordinary or usual means is difficult if not sometimes impossible, thus entailing not only much loss of time but even sometimes the loss of a machine tool.

Among the objects of this invention, therefore, is to provide a simple tool adapted to be carried in a tool box or kept in any other convenient or accessible place having means for extending well down into a tapped or partially tapped hole to grasp the broken tap and cause the removal thereof.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation showing my improvement in its relation to the broken portion of the tap.

Fig. 2 is a side elevation of the main portion of the improved tool in normal or closed position.

Fig. 3 is a transverse section on the line 3—3 of Fig. 1;

Fig. 4 is a transverse section on the line 4—4 of Fig. 2, Figs. 3 and 4 being on the same scale but larger than the first two figures; and Fig. 5 is a sectional detail of the ratchet mechanism.

Referring now more specifically to the drawings I show a broken tap removing tool comprising a chuck 10, or its equivalent, of any suitable construction and having a plurality of jaws 11 shown in this instance as four in number to correspond with the number of clearance grooves 12 formed in a tap 13 with which the improved tool is adapted to coöperate. Some taps have more grooves and some have less and consequently my proposition is to provide a chuck having as many jaws as there are grooves, or to provide a chuck with sets of interchangeable jaws the number in each set corresponding to the type of tap that may be used. Each of the jaws 11 has a long slender extension 14 all of which lie parallel and close against one another in normal closed position as shown in Figs. 2 and 4. The position of the jaws 11 with relation to each other may be modified or controlled by the adjustment of a knurled sleeve or collar 15 in a manner well understood in chucks.

Assuming that a hole *w* is being tapped in a piece of work W and because of a defective tap or excessive force being applied to the tap 13 the tap breaks off within the hole *w* the machinist will loosen the jaws 11 and project the extensions 14 down into the hole and farther into the grooves 12 of the broken tap somewhat as indicated in Figs. 1 and 3, and then will preferably tighten the collar 15 so as to stiffen the structure of jaws and projections clutching the projections firmly upon the tap. He may then withdraw the tap by unscrewing it from the partially threaded hole by the use of any suitable means shown herein as comprising a handle or lever 16 connected to the shank 17 of the chuck. Any suitable ratchet devices such as indicated at 18 may be employed between the handle or lever and the shank so that the shank may be actuated even when close to a wall or corner.

I claim:

The herein described broken tap remover, comprising a plurality of similar jaws tapering toward their ends and terminating in a like number of straight slender extensions having parallel sides to within a short distance of their points, the adjacent edges of said jaws and extensions being parallel forming a close nesting construction throughout the length of said jaws and extensions, the extensions being adapted to extend into the clearance grooves of the broken tap.

PETER PESA.